United States Patent [19]

Umezawa et al.

[11] Patent Number: 4,488,587
[45] Date of Patent: Dec. 18, 1984

[54] PNEUMATIC RADIAL TIRES

[75] Inventors: Yujiro Umezawa; Yoshio Suzuki, both of Higashimurayama; Teruo Miura; Kiyohito Kawasaki, both of Akigawa, all of Japan

[73] Assignee: Bridgestone Tire Company Limited, Tokyo, Japan

[21] Appl. No.: 498,218

[22] Filed: May 25, 1983

[30] Foreign Application Priority Data

Jun. 4, 1982 [JP] Japan .................................. 57-83219

[51] Int. Cl.³ .......................... B60C 9/08; B60C 9/20; D02G 3/36
[52] U.S. Cl. ............................... 152/359; 152/361 R; 57/902; 57/213; 57/230
[58] Field of Search ............... 152/356 R, 359, 357 R, 152/361 R, 361 FP, 361 DM; 57/902, 212–214, 218, 230, 231

[56] References Cited

U.S. PATENT DOCUMENTS

| | | | |
|---|---|---|---|
| 416,189 | 12/1889 | Stone | 57/213 |
| 4,158,946 | 6/1979 | Bourgois | 152/359 |
| 4,258,543 | 3/1981 | Canevari et al. | 57/212 |
| 4,332,131 | 6/1982 | Palsky et al. | 57/213 |
| 4,333,306 | 6/1982 | Yamashita et al. | 152/359 |
| 4,349,063 | 9/1982 | Kikuchi et al. | 57/902 |
| 4,399,853 | 8/1983 | Morimoto et al. | 152/359 |

FOREIGN PATENT DOCUMENTS

| | | | |
|---|---|---|---|
| 0163905 | 12/1981 | Japan | 152/359 |
| 2080845A | 2/1982 | United Kingdom | 57/213 |

OTHER PUBLICATIONS

"Rubber Articles Reinforced with High Tensile Steel Lord", *Research Disclosure* (#18441), (8-1979).

Primary Examiner—Lois E. Boland
Attorney, Agent, or Firm—Sughrue, Mion, Zinn, Macpeak, and Seas

[57] ABSTRACT

A pneumatic radial tire having an improved durable life is disclosed. In the pneumatic radial tire, a metal cord used in the carcass ply is characterized by having a layer construction of 3+9+1 wherein three filaments are twisted together to form a core, nine filaments each having the same diameter as in the filament for the core are twisted around the core to form a second layer and a single filament is wrapped around the second layer, and limiting a twisting angle $\alpha$ of the second layer to a range of $72.0° \leq \alpha \leq 78.0°$.

7 Claims, 8 Drawing Figures

PNEUMATIC RADIAL TIRES

BACKGROUND OF THE INVENTION

1. Field of the Invention

This invention relates to a pneumatic radial tire having an improved durable life by improving fatigue properties of metal cords to be used in a carcass ply.

2. Description of the Prior Art

In a radial tire, the carcass ply is subjected to a static strain for retaining an internal pressure and a repeated strain during the running under loading, so that it is required to have strength for retaining the internal pressure and fatigue resistance durable to the repeated strain.

On the other hand, metal cords having a simplified twisting construction or a reduced filament number are usually desired in view of the improvement of metal cord productivity, and a layer construction of 3+9+1 is known as a most simplified twisting construction.

However, in order to apply the metal cord of such a layer construction to the carcass ply for radial tires, it is necessary to make the diameter of filament large for compensating the reduction of cord strength due to the reduction of filament number. When the filament diameter is made large to use in the carcass ply, surface strain due to bending increases and the fatigue resistance degrades, so that fatigue resistance is necessary to be improved to make the application of such metal cord to the radial tire possible.

As a factor of deteriorating fatigue properties of the carcass ply, there have hitherto been considered (1) a fatigue of material due to repeated strain,
(2) an abrasion fatigue between mutual contact portions of filaments (fretting phenomenon) and
(3) a corrosion fatigue by water penetrating from exterior.

Particularly, it is seriously taken that the corrosion fatigue and fretting phenomenon considerably degrade the durable life of the tire.

As a countermeasure for solving the aforementioned drawbacks, it is disclosed in U.S. Pat. No. 4,258,543 and Japanese Patent laid open No. 56-43,008 that each filament constituting the cord is coated with rubber to reduce the abrasion due to mutual contact and to prevent the penetration of water. In order to attain the perfect rubber coating, it is necessary to leave a space between filaments. When such a cord is applied to the carcass ply, the arrangement of cords becomes non-uniform so that it is difficult to avoid premature breaking of a portion of the filaments constituting the cord due to uneven tension.

Furthermore, the coating of rubber cannot perfectly be achieved in the layer construction such as 3+9+1 or the like having the filament number larger than that of a single twisting construction.

SUMMARY OF THE INVENTION

With the foregoings in mind, the inventors have made studies with respect to the degree of rubber coating in the metal cord of layer construction (3+9+1) and fatigue properties of the carcass ply and unexpectedly found out that the fatigue properties of the carcass ply are considerably improved when the inside of the metal cord, i.e. an inner surface of a second layer (sheath) of the cord and an entire surface of filament in a first layer (core) of the cord are not coated with rubber.

Based on such a new knowledge, the inventors have made further investigations and found an advantageous twisting construction of the metal cord capable of restraining the penetration of coating rubber into the inside of the metal cord as far as possible during the vulcanization building of radial tire or the running thereof.

According to the invention, there is provided in a pneumatic radial tire containing metal cords as a tire reinforcement, the improvement in which as a carcass ply of the tire is used a metal cord having a layer construction of 3+9+1 wherein three filaments are twisted together to form a core, nine filaments each having the same diameter as in the filament for the core are twisted around the core to form a second layer and a single filament is wrapped around the second layer, and limiting a twisting angle $\alpha$ of the second layer to a range of $72.0° \leq \alpha \leq 78.0°$.

BRIEF DESCRIPTION OF THE DRAWINGS

The invention will now be described in detail with reference to the accompanying drawings, wherein.

DETAILED DESCRIPTION OF THE INVENTION

Figure 1:
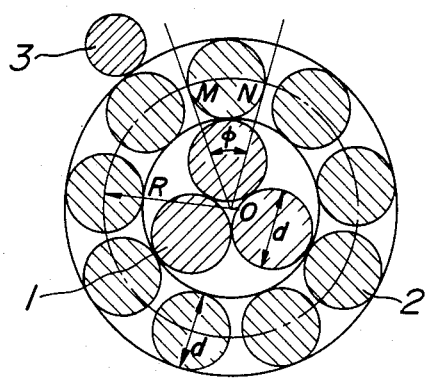
FIG. 1 is a sectional view of the metal cord with a layer construction of 3+9+1 according to the invention.

In FIG. 1 sectionally illustrates the metal cord according to the invention having a layer construction of 3+9+1 wherein a diameter of a filament 1 in the core is equal to a diameter of a filament 2 in the second layer. Now, when the filament (1, 2) has a circular section, it is understood from the following calculation that a space is existent between adjacent filaments 2 in the second layer. That is, when the filament diameter is d and a distance from a center O of the cord to a center of the filament 2 in the second layer is R as shown in FIG. 1, an angle $\phi$ between tangents OM and ON to the filament 2 from the cord center O is represented as $\phi = 2 \sin^{-1}(d/2R)$. Since $$R = \left(\frac{1}{\sqrt{3}} + 1\right) d,$$

the angle $\phi$ is 36.96°, which is smaller than an angle of 40° obtained by dividing 360° into nine equal parts.

Figure 2:
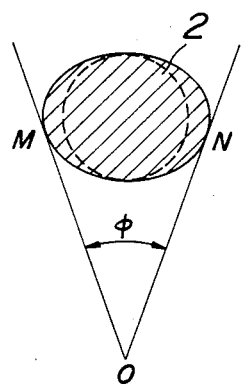
FIG. 2 is a sectional view of a filament in the second layer of the metal cord according to the invention.

From the above, it is considered that rubber penetrates into the inside of the metal cord through the space between the filaments 2 in the second layer during the vulcanization building of the tire. When a twisting angle of the second layer is 90°, the sectional shape of the filament 2 is circle. In the actual twisted cord, however, the sectional shape approaches to an ellipsoid. That is, when the twisting angle α of the second layer is made small, the sectional shape of the filament 2 changes from a dotted line into a solid line as shown in FIG. 2.

The angle φ between the two tangents to the filament 2 from the cord center widens as the twisting angle α becomes small, so that the space between the adjacent filaments 2 in the second layer becomes narrower.

Figure 3:
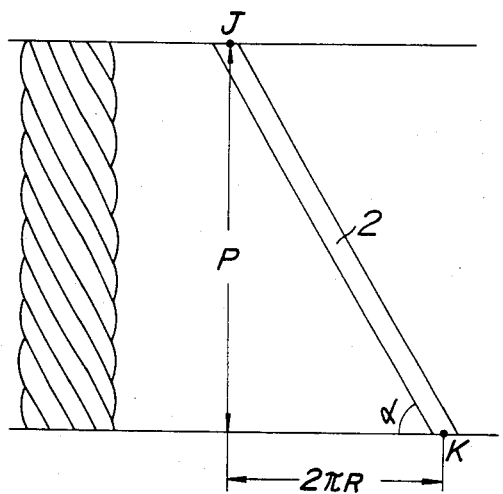
FIG. 3 is a developed view of the filament in the second layer of the metal cord.

Here, the twisting angle α is an angle defined between a straight line JK in the development of the filament 2 and a transverse section of the cord as shown in FIG. 3, which is calculated as $\alpha = \tan^{-1}(P/2\pi R)$ from a twisting pitch P of the filament 2, the distance R from the cord center to the center of the filament 2, the filament diameter d and $$R = \left(\frac{1}{\sqrt{3}} + 1\right) d.$$

Figure 4:
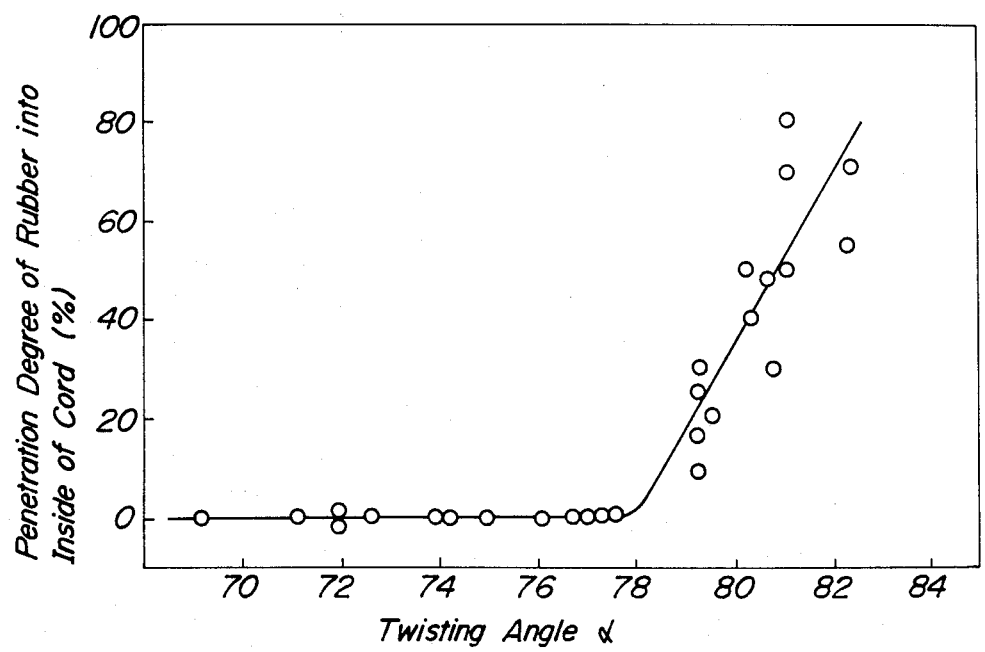
FIG. 4 is a graph showing a relation between the twisting angle of the second layer in the metal cord of FIG. 1 and the penetration degree of rubber into the inside of the metal cord.

In FIG. 4 is shown a relation between the twisting angle α of the second layer and the penetration degree (%) of rubber into the inside of the metal cord, which is experimentally obtained by varying the twisting angle of the second layer in the cord of FIG. 1.

The penetration degree of rubber into the inside of the cord is measured as an area ratio (%) of rubber adhered to surfaces of filaments 1 in the core of the cord taken out from the vulcanization built tire.

From FIG. 4, it is understood that the penetration of rubber into the inside of the cord can be prevented when the twisting angle α of the second layer is not more than 78°. On the other hand, when the twisting angle α is substantially less than 72°, the adjacent filaments 2 of the second layer overlap with each other and the sectional shape of the cord becomes clearly non-uniform and consequently the fretting resistance lowers largely. Therefore, the twisting angle α of the second layer in the metal cord is important to be within a range of 72° to 78° in order to prevent the penetration of rubber into the inside of the cord and improve the fatigue properties of the cord while restraining abrasion fatigue of the cord. Such a limitation of the twisting angle can develop the same effect on a layer construction of 3+9 in addition to the layer construction of 3+9+1.

In order to advantageously practise the invention, it is more favorable that a preforming ratio F of a filament in the cord and/or the second layer of the metal cord having the layer construction of 3+9+1 is within a range of 0.90–1.15.

Figure 5A:
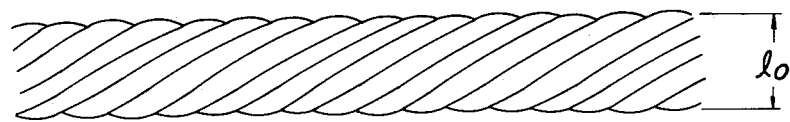
FIG. 5 is a diagrammatic view illustrating a diameter of the metal cord and an undulated diameter of a filament after the disentangelement of the metal cord.
Figure 5B:
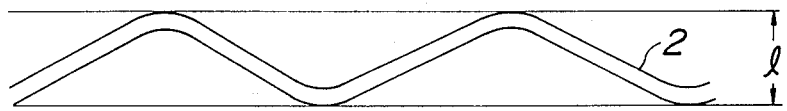

The preforming ratio F is calculated by $F = l/l_o$ from a diameter $l_o$ of the cord and an undulated diameter $l$ of a filament after the disentanglement of the cord as shown in, for example, the 3+9 construction in FIG. 5.

In the metal cord according to the invention, a contact point or a contact line is existent between the adjacent filaments of the second layer, between the core and the filament of the second layer, and between the adjacent filaments of the core, respectively, so that if it is intended to use this metal cord in the carcass ply for the radial tire, friction is caused at the contact portion to produce an energy loss. Therefore, by reducing such friction loss can be controlled the fretting phenomenon. In this connection, the inventors have noted that the preforming ratio F is as low as less than 0.85 in the conventional steel cord of this type and particularly is not more than 0.5 in the cord having a long twisting pitch, and found that when the preforming ratio of this steel cord is raised to 0.90–1.15, fatigue due to fretting is mitigated while restraining the friction loss to further enhance the effect based on the limitation of the twisting angle of the second layer as described above.

The reason why the preforming ratio is limited to 0.90–1.15 is based on the fact that when the preforming ratio is less than 0.90 or exceeds 1.15, the friction loss increases undesirably.

Figure 6:
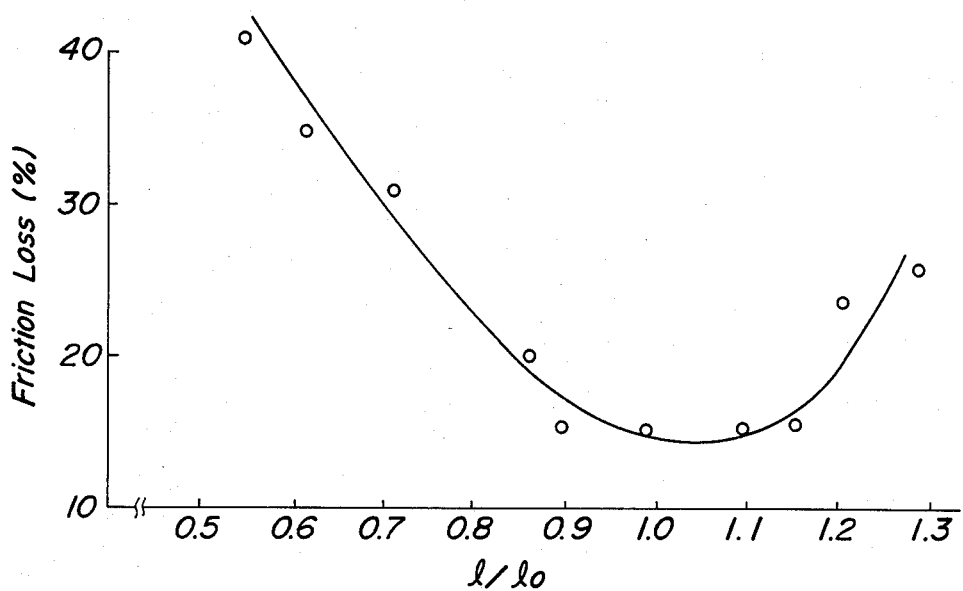
FIG. 6 is a graph showing a relation between the preforming ratio and the friction loss.

In the steel cord having the layer construction of FIG. 1 wherein the diameter of filaments 1, 2 in the core and second layer is 0.15 mm, the diameter of a wrapping filament 3 is 0.12 mm and the twisting angle of the second layer is 75°, the friction loss is measured by applying the same preforming ratio to the core and the second layer and varying the preforming ratio within a range of 0.55–1.3 to obtain a result as shown in FIG. 6.

Figure 7:
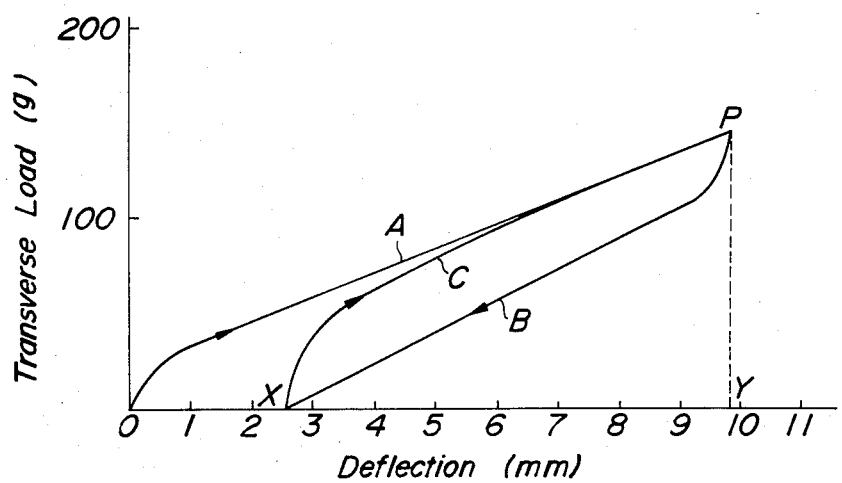
FIG. 7 is a graph showing a relation between the deflection and the transverse load.

The friction loss is measured as follows: that is, a hysteresis loop OAPBXCP or deflection-transverse load shown in FIG. 7 is first determined by a three-point bending test under a transverse load at center, from which is calculated a ratio (%) of area XCPB/area XCPY × 100 as the friction loss.

As apparent from FIG. 6, the friction loss rapidly increases when the preforming ratio is less than 0.9 or exceeds 1.15.

Figure 8:
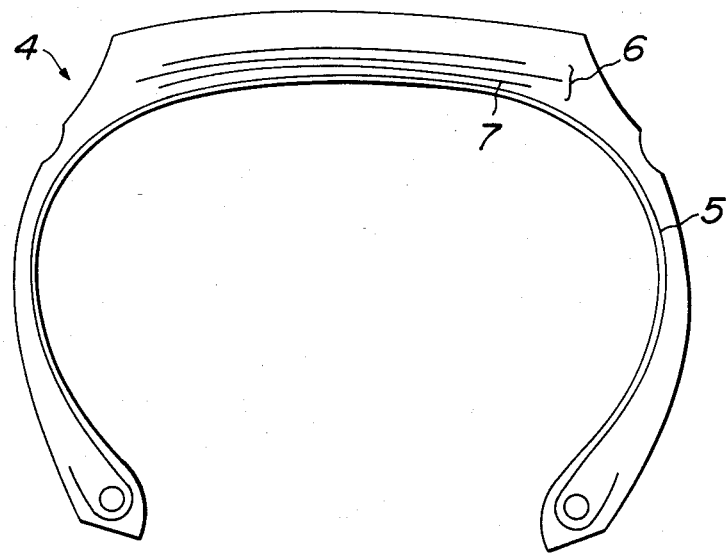
FIG. 8 is a schematically sectional view of an embodiment of the pneumatic radial tire according to the invention.

According to the invention, the durable life of the tire can be improved by applying the metal cord of the above mentioned structure to a carcass ply 5 of the radial tire as shown in FIG. 8. Furthermore, the similar effect may be given even when the metal cord is used as a material for a belt 6.

The following examples are given in illustration of the invention and are not intended as limitations thereof.

EXAMPLE 1

In a steel radial tire for light truck having a size of 750R 16, 8 ply rating, six kinds of steel cords each having a twisting angle of a second layer shown in the following Table 1 were used at an end count of 40 cords/5 cm as a carcass ply. All of these steel cords had a layer construction of 3+9+1 wherein the filament diameter in the core and second layer was 0.15 mm, the diameter of the wrapping filament was 0.12 mm and the preforming ratio in the core and second layer was 1.0. Each steel cord was used by coating with a rubber composition comprising 90 parts by weight of natural rubber, 10 parts by weight of synthetic polyisoprene rubber, 50 parts by weight of carbon black HAF, 1 part by weight of antioxidant (N-phenyl-N'-isopropyl-o-phenylenediamine), 2 parts by weight of aromatic oil, 10 parts by weight of ZnO, 0.5 part by weight of vulcanization accelerator (N-oxydiethylene-2-benzothiazole sulfenamide) and 5 parts by weight of sulfur. Then, the corrosion fatigue resistance, fretting resistance and penetration degree of rubber into inside of cord were evaluated with respect to these six tires to obtain results as shown in Table 1. Moreover, these properties were evaluated as follows:

The test tire was left to stand at a temperature of 80° C. in an atmosphere having a relative humidity (RH) of 100% for 2 weeks and thereafter inflated to an internal pressure of 7.0 kg/cm² and run on an ordinary indoor test drum under a load of 1.5 tons over a distance of 70,000 km. Then, the steel cord was taken out from the carcass of the tire and subjected to evaluations of corrosion fatigue resistance and fretting resistance.

Corrosion fatigue resistance

The steel cord taken out from the carcass was subjected to a rotation bending test to obtain a so-called S-N curve of bending strain and repeated number, from which a fatigue limit was measured. The corrosion fatigue resistance was defined by an index calculated according to the following equation. The larger the index value, the better the property.

$$\text{Index of corrosion fatigue resistance} = \frac{\text{Fatigue limit of test tire}}{\text{Fatigue limit of tire No. 6}} \times 100$$

Fretting resistance

After the coating rubber for the steel cord was removed by dissolution, steel filaments were disentangled from the steel cord. Then, nine steel filaments in the second layer were observed by means of a metallurgical microscope to measure a deepest fretted portion, whose depth was indicated as a fretting depth by an index calculated according to the following equation. The larger the index value, the better the property.

$$\text{Index of fretting resistance} = \frac{\text{Fretting depth of tire No. 6}}{\text{Fretting depth of test tire}} \times 100$$

Penetration degree of rubber into inside of cord

The steel cord was taken out from the tire after the vulcanization building, from which the wrapping filament and the filaments of the second layer were removed to leave the core. Then, the strand surface of the core was observed by means of a metallurgical microscope, from a magnified photograph of which was measured a ratio of rubber adhered area to total surface area of core strand as a penetration degree.

TABLE 1

| Tire No. | | 1 (Example) | 2 (Example) | 3 (Example) | 4 (Comparative Example) | 5 (Comparative Example) | 6 (Comparative Example) |
|---|---|---|---|---|---|---|---|
| Twisting angle of second layer in steel cord | | 74.9° | 76.7° | 77.5° | 71.1° | 81.1° | 79.5° |
| Tire performances | Corrosion fatigue resistance | 143 | 147 | 138 | 105 | 98 | 100 |
| | Fretting resistance | 105 | 102 | 100 | 78 | 98 | 100 |
| | Penetration degree or rubber into inside of cord (%) | 0 | 0 | 0 | 0 | 70 | 40 |

As apparent from Table 1, when the twisting angle of the second layer in the steel cord is within a range of 72° to 78°, the corrosion fatigue resistance and fretting resistance are excellent and the durable life of the tire can be considerably improved.

EXAMPLE 2

In a steel radial tire for large truck having a size of 1000R 20, 14 ply rating, six kinds of steel cords having a twisting angle of a second layer and preforming ratios in core and second layer shown in the following Table 2 were used at an end count of 30 cords/5 cm as a carcass ply. All of these steel cords had a layer construction of 3+9+1 wherein the filament diameter in the core and second layer was 0.23 mm and the diameter of the wrapping filament was 0.19 mm.

Each of these six steel cords was used by coating with the same rubber composition as described in Example 1. Then, the corrosion fatigue resistance, fretting resistance and penetration degree of rubber into inside of cord were evaluated with respect to the resulting six tires in the same manner as described in Example 1 to obtain results as shown in Table 2. In this case, tire No. 12 was used instead of tire No. 6 as a standard tire for obtaining indices of the corrosion fatigue resistance and fretting resistance. Moreover, the drum running condition was an internal pressure of 7.25 kg/cm², a load of 2.5 tons and a running distance of 70,000 km.

TABLE 2

| Tire No. | | 7 (Example) | 8 (Example) | 9 (Example) | 10 (Example) | 11 (Comparative Example) | 12 (Comparative Example) |
|---|---|---|---|---|---|---|---|
| Twisting angle of second layer in steel cord | | 74.0° | 75.8° | 75.8° | 75.8° | 69° | 79.3° |
| Performing ratio in core and second layer | | 1.05 | 0.95 | 1.20 | 0.80 | 0.80 | 0.80 |
| Tire performances | Corrosion fatigue resistance | 150 | 155 | 135 | 145 | 105 | 100 |
| | Fretting resistance | 130 | 135 | 105 | 103 | 82 | 100 |
| | Penetration degree of rubber into inside of cord (%) | 0 | 0 | 0 | 0 | 0 | 45 |

As apparent from Table 2, when comparing tire No. 10 with tire Nos. 11 and 12, even if the filament diameter is as large as 0.23 mm, the effect by the limitation of twisting angle of second layer is developed satisfactorily. Further, it can be seen from the data of tire Nos.

7-10 that the fatigue properties are further improved by limiting the preforming ratio to a range of 0.90-1.15.

What is claimed is:

1. A pneumatic radial tire containing metal cords as a tire reinforcement comprising; a rubberized carcass ply having a metal cord coated with a coating rubber, said metal cord having a layer construction of 3+9+1 with three filaments twisted together to form a core, nine filaments each having the same diameter as in the filament for the core and twisted around the core to form a second layer and a single filament wrapped around the second layer, a twisting angle $\alpha$ of the second layer limited to a range of $72.0° \leq \alpha \leq 78.0°$, and wherein the surfaces of the filaments forming said core are not covered with said coating rubber.

2. A pneumatic radial tire according to claim 1, wherein the filament in said core and/or second layer has a preforming ratio of 0.90-1.15.

3. A pneumatic tire of claim 2 wherein the diameter of the filaments of said core and said second layer are 0.15 mm, the diameter of said single filament is 0.12 mm and said preforming ratio is 1.0.

4. A pneumatic tire of claim 1 wherein said coating rubber covers said single filament and the outer surfaces of filaments forming said second layer, said coating rubber comprising, 90 parts by weight of natural rubber, 10 parts by weight of synthetic polyisoprene rubber, 50 parts by weight of carbon black HAF, 1 part by weight of an antioxidant, 2 parts by weight of aromatic oil, 50 parts by weight of ZnO, 0.5 part by weight of a vulcanization accelerator and 5 parts by weight of sulfur.

5. A pneumatic tire of claim 1 wherein the diameter of the filaments of said core and said second layer are 0.23 mm and the diameter of said single filament is 0.19 mm.

6. A pneumatic radial tire containing metal cords as a tire reinforcement comprising a rubberized belt ply having a metal cord coated with a coating rubber, said metal cord having a layer construction of 3+9+1 with three filaments twisted together to form a core, nine filaments each having the same diameter as in the filament for the core and twisted around the core to form a second layer and a single filament wrapped around the second layer, a twisting angle $\alpha$ of the second layer limited to a range of $72.0° \leq \alpha \leq 78.0°$, and wherein surfaces of the filaments forming said core are not covered with said coating rubber.

7. A pneumatic radial tire according to claim 6 wherein the filament in said core and/or second layer has a preforming ratio of 0.90-1.15.

* * * * *